US009643828B2

(12) United States Patent
Brown et al.

(10) Patent No.: US 9,643,828 B2
(45) Date of Patent: May 9, 2017

(54) ARCUATE MULTI-DISPENSING BEVERAGE DISPENSER

(71) Applicant: Manitowoc Foodservice Companies, LLC, Manitowoc, WI (US)

(72) Inventors: James W. Brown, Crestwook, KY (US); Gilles Argivier, Sellersburg, IN (US); Janice M. K. Jaferian, Palm Harbor, FL (US)

(73) Assignee: MANITOWOC FOODSERVICE COMPANIES, LLC, Manitowoc, WI (US)

( * ) Notice: Subject to any disclaimer, the term of this patent is extended or adjusted under 35 U.S.C. 154(b) by 0 days.

(21) Appl. No.: 14/195,363

(22) Filed: Mar. 3, 2014

(65) Prior Publication Data

US 2014/0299630 A1 Oct. 9, 2014

Related U.S. Application Data

(63) Continuation-in-part of application No. 29/451,758, filed on Apr. 8, 2013, now Pat. No. Des. 704,977, and (Continued)

(51) Int. Cl.

*B67B 7/00* (2006.01)
*G01F 11/00* (2006.01)

(Continued)

(52) U.S. Cl.

CPC ............. *B67D 1/06* (2013.01); *B67D 1/0888* (2013.01); *B67D 3/0054* (2013.01); *F25C 5/002* (2013.01); *B67D 2210/00031* (2013.01)

(58) Field of Classification Search

CPC ...... B67D 1/06; B67D 1/0888; B67D 3/0054; B67D 1/0878; B67D 1/0021; F25C 5/002

(Continued)

(56) References Cited

U.S. PATENT DOCUMENTS

2010/0084426 A1 * 4/2010 Devers et al. .................... 222/2
2010/0125362 A1 * 5/2010 Canora et al. ................ 700/236

(Continued)

OTHER PUBLICATIONS

Canadian Office Action dated Apr. 8, 2014 for Canadian application No. 153420.

(Continued)

*Primary Examiner* — Patrick M Buechner
*Assistant Examiner* — Jeremy W Carroll
(74) *Attorney, Agent, or Firm* — Ohlandt, Greeley, Ruggiero & Perle, LLP

(57) ABSTRACT

Disclosed is a beverage dispenser having a plurality of non-linear dispensing sides each having a dispensing station of a dimension suitable to comfortably accommodate a user/operator. Each dispensing station is of a dimension narrower than that of a dispensing station of a conventional dispenser. The beverage dispenser of the present disclosure allows for variations and flexibility in the shape of the unit, and a user-friendly touch screen accommodates one or more concurrent users/operators, while also allowing a choice of various beverage selections. The touch screen provides a user interface that may be configured for use by a restaurant employee and/or self-service applications. In addition, the user friendly touchscreen interface also facilitates the use of ADA compliant controls. The beverage dispenser of the present disclosure also allows for "banking" of multiple units into a "kiosk" type formation.

10 Claims, 8 Drawing Sheets

Related U.S. Application Data a continuation-in-part of application No. 29/451,755, filed on Apr. 8, 2013, now Pat. No. Des. 702,985.

(51) Int. Cl.

| | |
|---|---|
| ***B67D 1/06*** | (2006.01) |
| ***B67D 1/08*** | (2006.01) |
| ***F25C 5/00*** | (2006.01) |
| ***B67D 3/00*** | (2006.01) |

(58) Field of Classification Search

USPC .............................................................. 222/1

See application file for complete search history.

(56) References Cited

U.S. PATENT DOCUMENTS

| | | | | |
|---|---|---|---|---|
| 2010/0139493 | A1* | 6/2010 | Nevarez et al. | 99/275 |
| 2010/0200110 | A1* | 8/2010 | Segiet et al. | 141/94 |
| 2011/0061420 | A1* | 3/2011 | Anderson et al. | 62/389 |
| 2011/0168738 | A1* | 7/2011 | Nevarez et al. | 222/129.1 |
| 2012/0132673 | A1* | 5/2012 | Leyva | 222/146.6 |

OTHER PUBLICATIONS

Canadian Office Action dated Jul. 9, 2015 for Canadian application No. 153420.

* cited by examiner

ARCUATE MULTI-DISPENSING BEVERAGE DISPENSER

CROSS-REFERENCED APPLICATION

This application is a continuation-in-part of design application No. 29/451,758, filed Apr. 8, 2013, and this application is a continuation-in-part of design application No. 29/451,755, filed Apr. 8, 2013. Design application No. 29/451,758, filed Apr. 8, 2013 and design application No. 29/451,755, filed Apr. 8, 2013 are incorporated by reference herein in their entirety.

BACKGROUND

1. Field of the Disclosure

The present disclosure relates generally to a non-linear beverage dispenser that offers two or more points of dispense for a plurality of concurrent users. The non-linear beverage dispenser provides the flexibility of products served, configurations, and flexibility/ease of use and may be configured to dispense blended ice drinks, smoothies, carbonated soft drinks, juices and teas and combinations of them.

2. Description of the Related Art

Currently restaurants serve a variety of beverages such as carbonated drinks and non-carbonated drinks. The state of the art beverage dispensers is such that each different type of beverage served is generally provided from its own dispensing machine that is dedicated to that type of beverage. For example, a restaurant serving juice beverages and smoothies would provide two different beverage dispensers, one for dispensing the juice beverages and one for serving the smoothies. Similarly, a restaurant serving cold soda beverages and hot beverages such as tea, coffee and hot chocolate would provide two separate beverage dispensers, one for the cold soda beverages and one for the hot beverages.

Having separate beverage dispensers for each type of beverage has several disadvantages, both for the restaurant establishment and for the user/operator. With respect to the restaurant establishment, the disadvantages include the need for sufficient counter and/or floor space to accommodate the individual footprint of each beverage dispenser. Also, for the restaurant establishment and the user/operator, having separate beverage dispensers for each type of beverage offered for sale requires the user/operator to move between beverage dispensers machines in order to dispense different types of beverages. This is inconvenient for both the user (consumer) and operator (restaurant establishment employees), providing for wasted time and effort. Separate dispensing machines also lead to additional problems, such as more service calls, increased preventative maintenance and calibration and the need to store and have available extra spares parts.

In addition to the dispensing limitations of conventional beverage dispensing machines, above, another problem with these dispensers is that each can accommodate only one user/operator at a time. Referring to FIG. 1, a beverage dispensing machine 10 currently available has a straight linear dispensing front with a length 12 of 30 inches that does not allow sufficient room for more than one user 14 to use beverage dispensing machine 10 at the same time. Each user/operator must wait his "turn" at the beverage dispenser to dispense a beverage. The average user has a shoulder width 16 of 18 inches. Accordingly, a beverage dispensing machine having a length of 36 inches would be required at least to permit two users to use the beverage dispensing machine at the same time. This situation renders the use of conventional beverage dispensing machines not efficient as could be, especially in the environment of fast food restaurants.

Thus, a need exists for a beverage dispenser that overcomes the shortcomings caused by having separate beverage dispensing machines for each type of beverage. The present disclosure provides a dispensing machine that overcomes the shortcomings and satisfied those needs.

SUMMARY

The beverage dispenser of the present disclosure can be configured in any one of a number of flexible arrangements, providing the opportunity to the restaurant establishment for a configurable beverage dispensing "station". In general, the beverage dispenser of the present disclosure comprises a plurality of non-linear dispensing sides each having a dispensing station, each dispensing station having a dimension suitable to comfortably accommodate a user/operator. Each dispensing station of the non-linear dispensing side is of a dimension narrower than that of a dispensing station of a conventional dispenser, yet is of a dimension that is sufficient for the comfortable user/operator.

The beverage dispenser of the present disclosure is provided with a plurality of beverages for dispensing. The plurality of beverages for dispensing may be located at the beverage dispenser or remotely from the beverage dispenser, by apparatuses and methods known to those of skill in the art. Similarly, the beverage dispenser of the present disclosure may be provided with an "on board" ice making apparatus or ice may be provided to the beverage dispenser from a remote location, also according to apparatuses and methods known to those of skill in the art.

In one configuration, the beverage dispenser of the present disclosure provides for a plurality of dispensing stations each having a beverage dispense point comprised of a beverage dispenser. Each beverage dispenser may dispense any of the beverages provided to and available for dispensing at the beverage dispenser, and the same beverage may be dispensed concurrently from each of the plurality of beverage dispense stations. In another embodiment, the present disclosure provides for a countertop beverage dispensing unit for those restaurant establishments serving beverages that have limited space and/or have floor plan layout challenges. The countertop unit possesses the same beverage dispensing flexibility; however, all ingredients are remotely chilled and pumped to the point of dispensing via known conduit technology/systems.

The beverage dispenser of the present disclosure allows for variations and flexibility in the shape of the unit, and a user-friendly touch screen accommodates one or more concurrent users/operators, while also allowing a choice of various beverage selections. The beverage dispenser of the present disclosure also allows for "banking" of multiple units into a "kiosk" type formation. In the kiosk type formation, accommodation may be provided for space between the individual beverage dispensers of the kiosk for storage and dispensing of, e.g., cups, lids and/or straws, among other similar items. The user-friendly touch screen provides a user interface that may also be configured so that the beverage dispenser may be utilized for restaurant employee beverage service and/or self-service applications, as desired. In addition, the user friendly touchscreen interface also facilitates the use of ADA compliant controls.

BRIEF DESCRIPTION OF THE DRAWINGS

The foregoing and other benefits of the beverage dispenser of the present disclosure will become further apparent to those skilled in the art from the detailed disclosure and the following Figures, in which.

DESCRIPTION OF THE PREFERRED EMBODIMENTS

Figure 1:
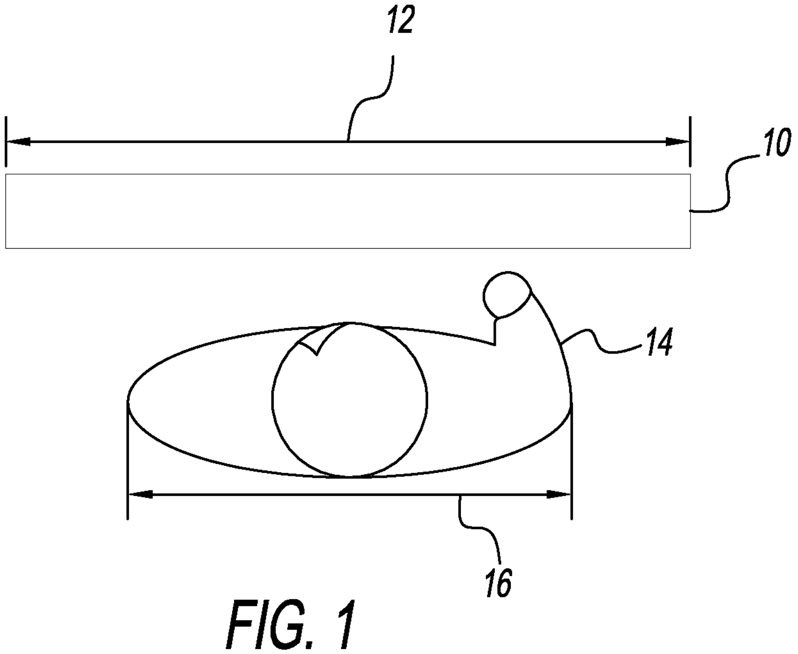
FIG. 1 (Prior Art)
FIG. 1 is an overhead view of a prior art beverage dispenser.
Figure 2A:
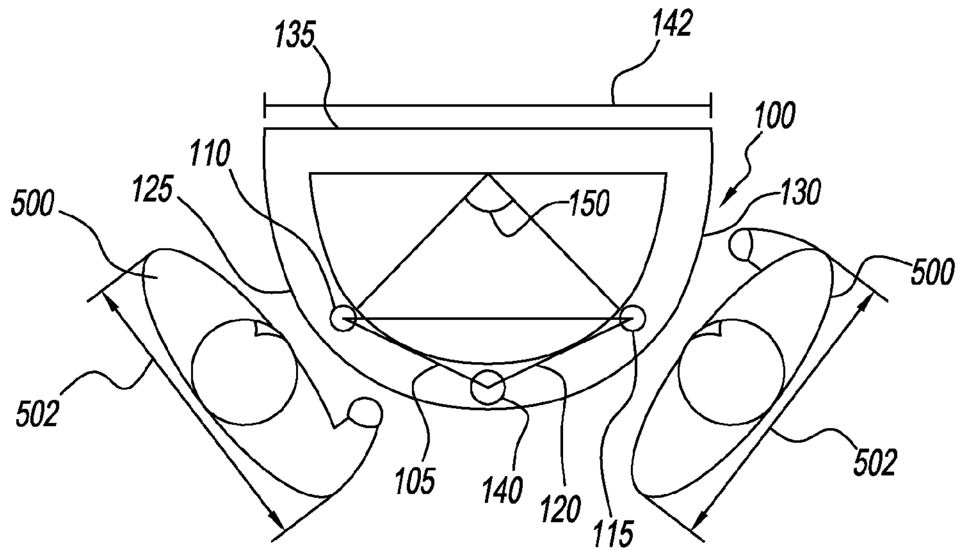
FIGS. 2A-2B are overhead views of two embodiments of a beverage dispenser of the present disclosure and FIG. 2C is a schematic depiction of the non-linear feature of the beverage dispenser of the present disclosure.

FIG. 2A shows a top view of an exemplary embodiment of a beverage dispenser assembly 100, hereinafter "assembly 100", according to the present disclosure. Assembly 100 has a housing 105. Housing 105 houses a first beverage dispenser 110 and a second beverage dispenser 115 in a dispense portion 120. Dispense portion 120 has a shape that is non-linear to form a first side 125 and a second side 130. First side 125 and second side 130 form a shape that is an arc.

First beverage dispenser 110 has a nozzle positioned on first side 125 of dispense portion 120 of housing 105. Second beverage dispenser 115 has a nozzle positioned on second side 130 of dispense portion 120 of housing 105. Housing 105 houses an ice dispenser 140 that is along dispense portion 120 between first beverage dispenser 110 and second beverage dispenser 115. Housing 105 has a flat portion 135 on a side opposite dispense portion 120. Flat portion has a length 142, for example, of greater than or equal to 30 inches, and more preferably, 30 inches. Alternatively, ice dispenser 140 may be a beverage dispenser, and first beverage dispenser 110 and/or second beverage dispenser 115 may be ice dispensers.

A user 500 has a shoulder width 502. An average shoulder width of a person is 18 inches. Each user 500 can access one of first beverage dispenser 110 and second beverage dispenser 115 simultaneously. Assembly 100 allows two users 500 to use assembly 100 simultaneously as the front of the dispenser is arched to allow greater than 40 inches of useable space sufficient for two users.

Figure 2B:
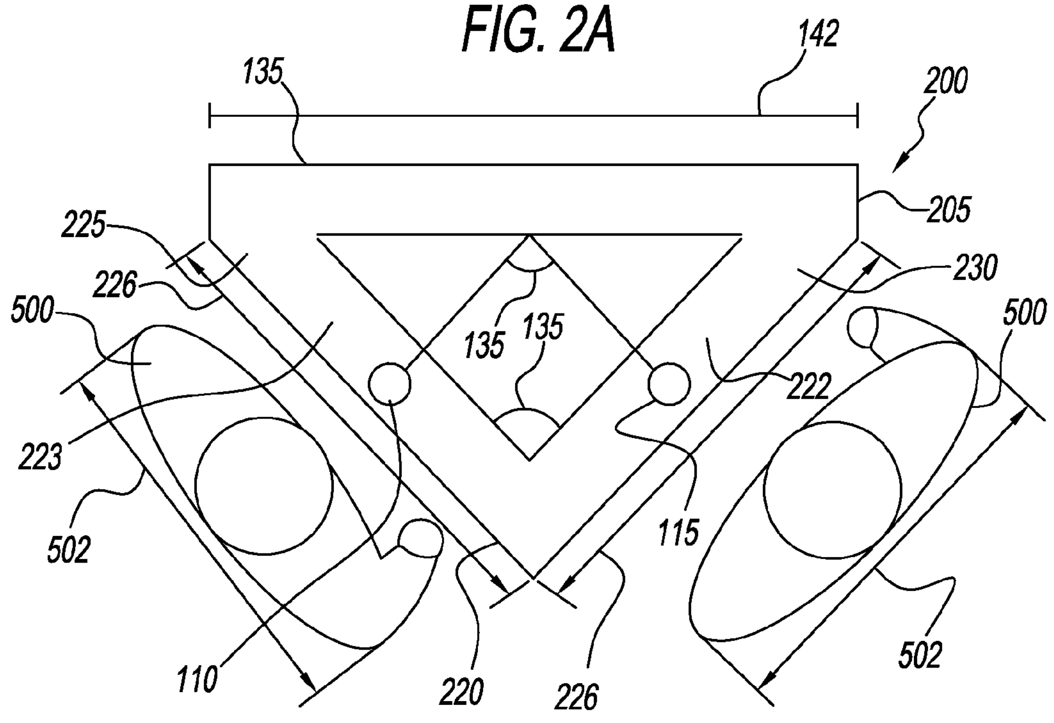
Figure 2C:
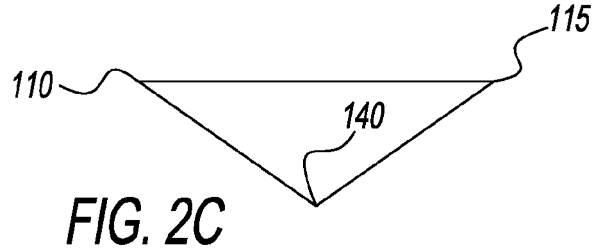

FIG. 2C is a schematic depiction of the non-linear feature of the beverage dispenser of the present disclosure. The arc shape of first side 125 and second side 130 form a shape that is an arc having a triangular layout of dispense points that include first beverage dispenser 110, second beverage dispenser 115, and ice dispenser 140.

Figure 7:
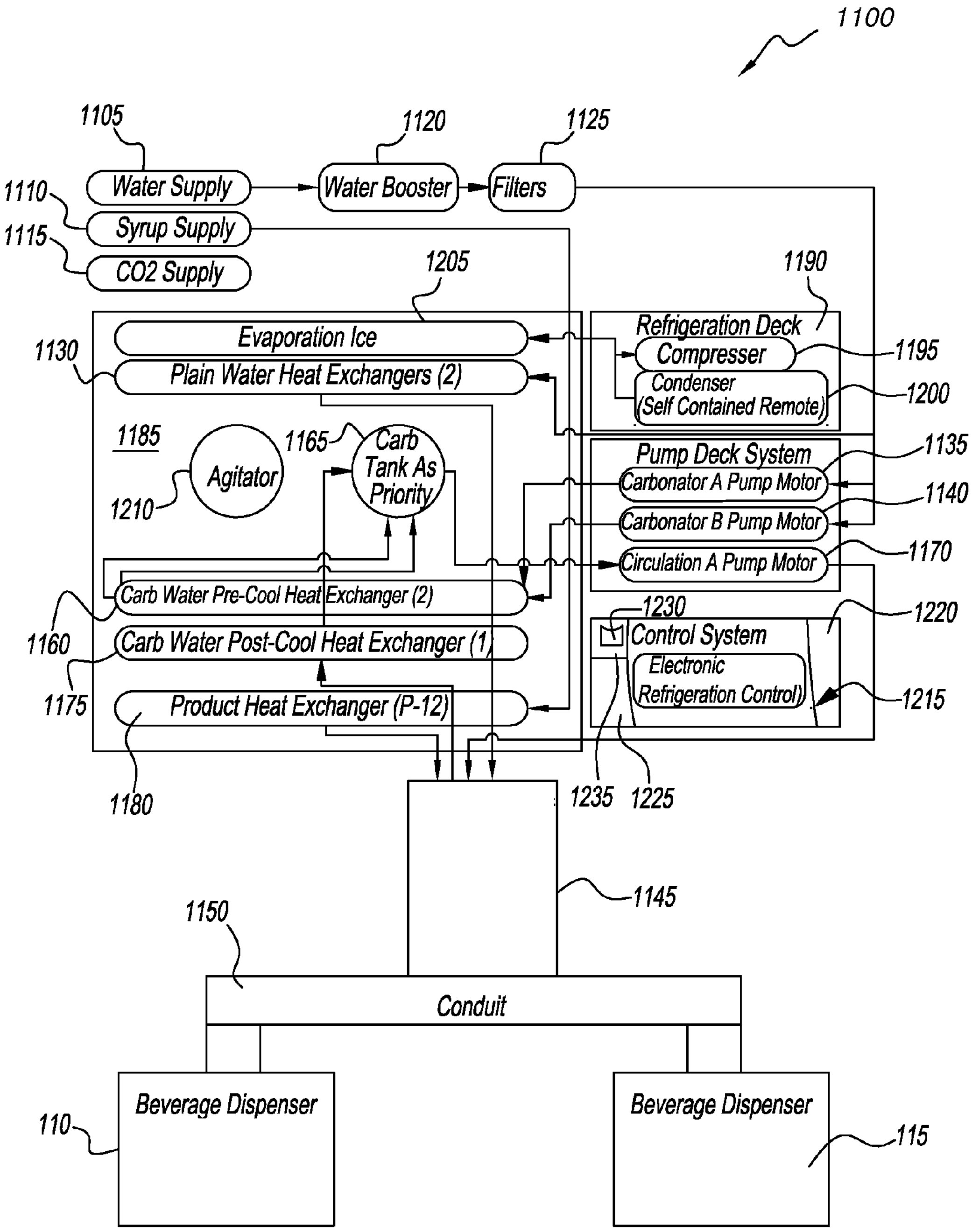
FIG. 7 is an illustrative diagram of an example of a beverage dispenser.

First beverage dispenser 110 and second beverage dispenser 115 are beverage dispensers as are known in the art that each have a nozzle. The nozzle may be positioned in housing 105 while the remaining components of first beverage dispenser 110 and second beverage dispenser 115 are positioned remotely from housing 105 with connections to first beverage dispenser 110 and second beverage dispenser 115 in housing 105. FIG. 7 is an illustrative diagram of a beverage dispenser 1100 ("system 1100") that can be used as first beverage dispenser 110 and/or second beverage dispenser 115. System 1100 is connected to a water supply 1105, a syrup supply 1110 and a carbon dioxide supply 1115. Water supply 1105 may be any water source, for example, a public water supply. Carbon dioxide supply 1115 may be any source of carbon dioxide.

Figure 8:
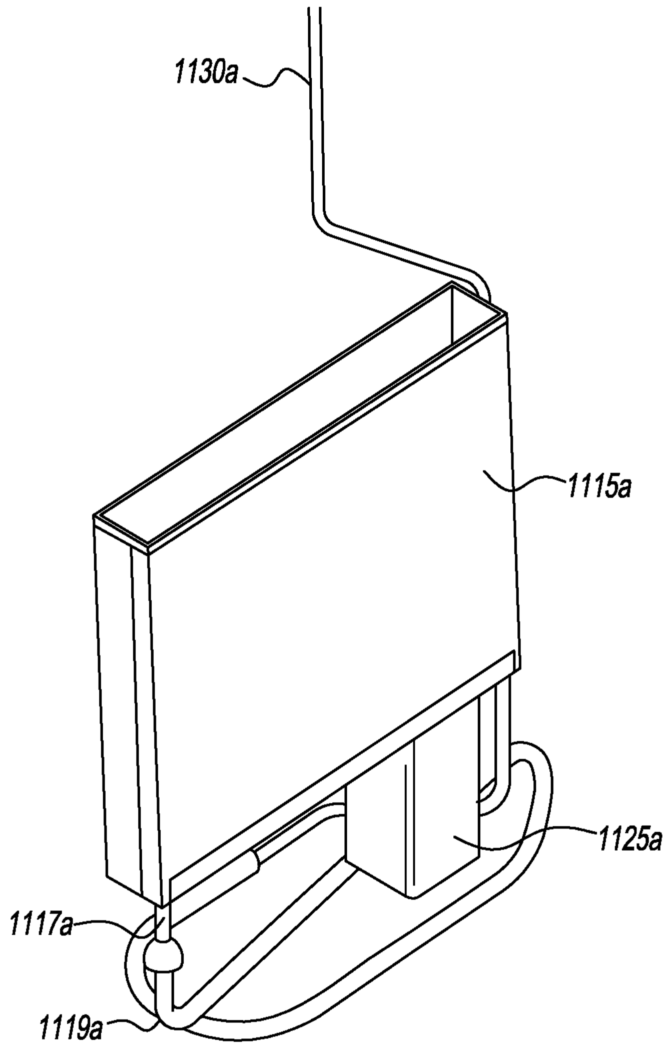
FIG. 8 is a front perspective view of a flavor/ingredient dispensing module of the beverage dispenser.

Syrup supply 1110 may supply any flavoring that is used to form a beverage, for example, FIG. 8 is a front perspective view of an example of syrup supply 1110. Conduit **1119*a* may connect to a pump 1125*a*. Pump 1125*a* selectively moves a portion of the ingredient from the container in holders 1115*a* through connection tube 1117*a*, to conduit 1119*a*, to a line conduit 1130*a*, and to a dispenser nozzle to dispense the ingredient out of assembly 100, for example, to a cup. Pump 1125*a* may be an air powered pump that may include a diaphragm. Pump 1125*a*** may also be a pressure pump, or a peristaltic pump.

Referring back to FIG. 7, system 1100 has a booster 1120 that is connected to water supply 1105. The water from water supply 1105 passes through filters 1125 of system 1100 that is connected to booster 120. Booster 1120 increases water pressure, which feeds both a plain water heat exchanger and a carbonator. Filters 1125 remove contaminants and particulates in the supply water.

The water flows from filters 1125 to a plain water heat exchanger 1130 and carbonator pumps 1135 and 1140. Plain water heat exchanger 1130 cools or reduces a temperature of the water supplied thereto. Plain water refers herein to water that is not carbonated by a carbonator tank. The water flows from plain water heat exchanger 1130 to a line conduit 1145. The plain water flows from line conduit 1145 to first beverage dispenser 110 and second beverage dispenser 115 via conduit 1150. first Beverage dispenser 110 and second beverage dispenser 115 mix syrup and plain water to form a beverage and dispense the beverage through a nozzle to a user. Alternatively, first beverage dispenser 110 and second beverage dispenser 115 can dispense the plain water without syrup.

Carbonator pumps 1135 and 1140 each have a motor connected to a power source that operates a pump. Carbonator pumps 1135 and 1140 are each connected to one or more carbonated water pre-cool heat exchanger 1160. Carbonator pumps 1135 and 1140 generate a flow of the water from water supply 1105 to carbonated water pre-cool heat exchanger 1160. Carbonated water pre-cool heat exchanger 160 cools or reduces a temperature of the water supplied thereto.

The water flows from carbonated water pre-cool heat exchanger 1160 to a carbonator tank 1165. Carbonator tank 1165 combines carbon dioxide and water to form carbonated water.

The carbonated water flows from carbonator tank 1165 to a circulator pump 1170. Circulator pump 1170 has a motor connected to a power source that operates a pump. Circulator pump 1170 may be, for example, a magnetic drive pump that rotates an impeller via magnets and has no mechanical connection between the motor and the impeller. Circulator pump 1170 generates a flow of the carbonated water from circulator pump 1170 to line conduit 1145. Line conduit 1145 is connected to a carbonator water post-cool heat exchanger 1175 and beverage dispensers **1155*a*, and 155*c* by conduit 1150. The carbonated water flows from line conduit 1145 to first beverage dispenser 110 and second beverage dispenser 115 via conduit 1150. first Beverage dispenser 110 and second beverage dispenser 115 mix syrup and the carbonated water to form a beverage and dispense the beverage through a nozzle, for example, nozzle 4104, to a user. Alternatively, first beverage dispenser 110 and second beverage dispenser 115** can dispense the carbonated water without syrup.

Circulator pump 1170 circulates the carbonated water to carbonator water post-cool heat exchanger 1175 from line conduit 1145. Carbonator water post-cool heat exchanger 1175 cools or reduces a temperature of the carbonated water that is then circulated back into carbonator tank 1165. Circulator pump 1170 circulates the carbonated water from carbonator tank 1165 to circulator pump 1170, to line conduit 1145, to carbonator water post-cool heat exchanger 1175 and back to carbonator tank 1165 until the carbonated water is dispensed by one of first beverage dispenser 110 and second beverage dispenser 115.

Syrup supply 1110 is connected to product heat exchanger 1180. Product heat exchanger 1180 cools or reduces a temperature of the syrup from syrup supply 1110. Product heat exchanger 1180 is connected to a line conduit 1145 and supplies syrup thereto. Line conduit 1145 is connected to first beverage dispenser 110 and second beverage dispenser 115 via conduit 1150.

Carbon dioxide supply 1115 is connected to carbonator tank 1165. Carbon dioxide supply 1115 supplies carbon dioxide to carbonator tank 1165 that combines carbon dioxide and water to form the carbonated water.

Plain water heat exchanger 1130, carbonated water pre-cool heat exchanger 1160, carbonator tank 1165, carbonator water post-cool heat exchanger 1175, and product heat exchanger 1180 are all positioned within a water bath 1185. Water bath 185 is a container filled with cooling medium, for example, water and/or ice, to cool or reduce the temperature of the carbonated water in carbonator tank 1165, the plain water in plain water heat exchanger 1130, the carbonated water in carbonated water pre-cool heat exchanger 1160, the carbonated water in carbonator water post-cool heat exchanger 1175, and the syrup in product heat exchanger 1180. The cooling medium in water bath 1185 is in thermal communication with a refrigeration system 1190. Refrigeration system 1190 has a compressor 1195, a condenser 1200 and evaporator 1205 to perform a vapor compression cycle. Condenser 1200 may be remote from compressor 1190 and evaporator 1205 or in the same location therewith. Evaporator 1205 is in thermal communication with the cooling medium to cool or reduce the temperature thereof.

Water bath 1185 has an agitator 1210. Agitator 1210 has a motor connected to a power source that operates an agitator. Agitator 1210 generates a flow or moves the cooling medium in water bath 1185 to move the cooling medium into and out of contact with evaporator 1205 to cool the cooling medium and into and out of contact with plain water heat exchanger 1130, carbonated water pre-cool heat exchanger 1160, carbonator tank 1165, carbonator water post-cool heat exchanger 1175, and product heat exchanger 1180 to cool or reduce the temperature of each component and liquid therein. System 1100 has a control system 1215.

FIG. 2B shows a top view of an exemplary embodiment of an alternative beverage dispenser assembly 200, hereinafter "assembly 200", according to the present disclosure. Assembly 200 is the same as assembly 100, however, assembly 200 has a housing 205 with a dispense portion 220 of a different shape. Dispense portion 220 is formed of two linear segments 222, 223 forming an angle 224 to form a first side 225 and a second side 230. Angle 224 is less than 180 degrees. Two linear segments 222, 223 each have a length 226 that is greater than or equal to 18 inches.

Figure 3:
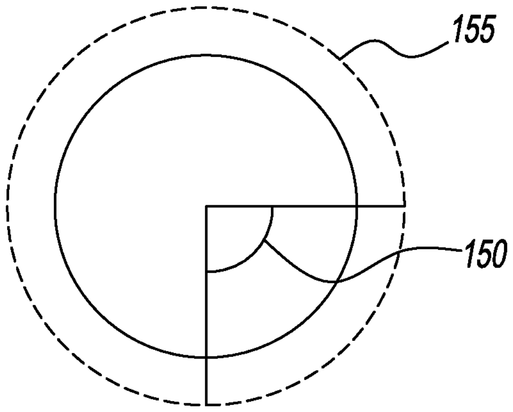
FIG. 3 is shows that the angle of operation of a beverage dispenser of the present disclosure is independent of the shape and dimensions of the beverage dispenser itself.

FIG. 3 shows an angle of operation 150 of assembly 100. Angle of operation 150 is independent of the shape and dimensions of the beverage dispenser itself. For example, assembly 100 and assembly 200 can have the same angle of operation 150. First side 125 and second side 130 form a shape that is an arc that has a central angle equal to angle of operation 150. Angle of operation 150 has a central angle of 90 degrees. Angle of operation 150 can have a central angle from 90 degrees to 360 degrees. Alternatively, dispense portion 120 may be other non-linear shapes that form a first side and a second side having angle of operation 150 from 90 degrees to 360 degrees. Angle of operation 150 is independent from the shape and dimensions of assembly 100 itself. More than one dispenser format can have the same angle of operation 150 or dispense area angle.

Figure 4:
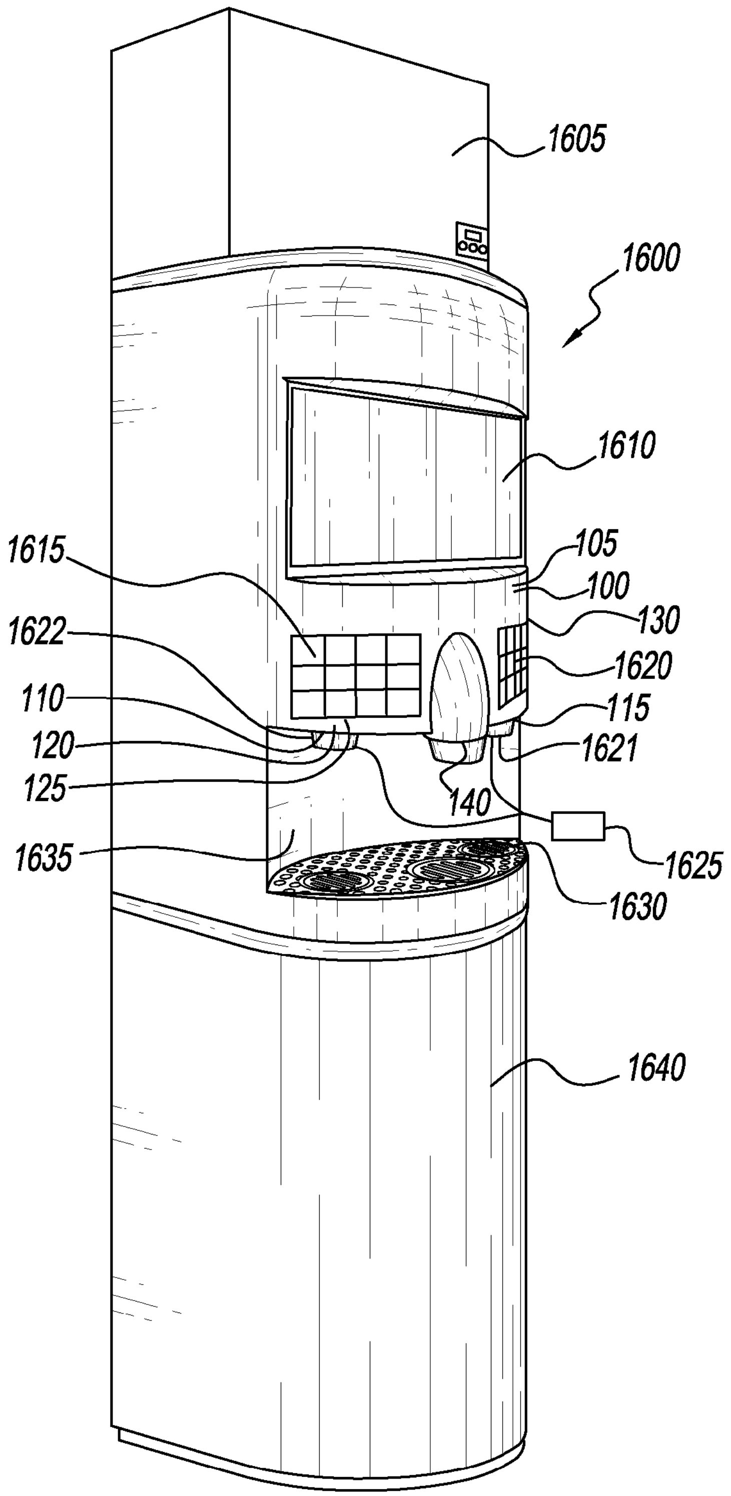
FIG. 4 shows a floor model of a beverage dispenser of the present disclosure.

FIG. 4 shows a floor model of a beverage dispenser system 1600 including assembly 100. Beverage dispenser system 1600 has an ice maker 1605 housing 105. Ice maker 1605 may be any ice maker known in the prior art, for example, ice maker 1605 may form nugget ice and/or flake ice.

Beverage dispenser system 1600 has a user interface 1610 connected in housing 105. User interface 1610 is flat. User interface 1610 may be removable allowing flexibility to interchange user interfaces, e.g., touch screen, membrane pad, etc. User interface 1610 allows for dispense of a different beverages for each of first beverage dispenser 110 and second beverage dispenser 115. Alternatively, or in addition to user interface 1610, housing 105 may be connected to a first user interface 1615 on first side 125 and a second user interface 1620 on second side 130 on an opposite side of ice dispenser 140. A first nozzle 1621 of first beverage dispenser 110 is positioned below first user interface 1615 and a second nozzle 1622 of second beverage dispenser 115 is positioned below second user interface 1620. First user interface 1615 and/or second user interface 1620 may be removable. First user interface 1615 and second user interface 1620 allow for dispense of different beverages for each of first beverage dispenser 110 and second beverage dispenser 115.

First beverage dispenser 110 and second beverage dispenser 115 are controlled by a controller 1625 that allows each of first beverage dispenser 110 and second beverage dispenser 115 to operate even if the other of first beverage dispenser 110 and second beverage dispenser 115 is not operating.

Housing 105 has a support surface 1630 below first nozzle 1621 and second nozzle 1622. Housing 105 has a space 1635 between first nozzle 1621 and second nozzle 1622 and support surface 1630. Assembly 100 is supported on a support 1640. Support 1640 houses one or more components of first beverage dispenser 110 and second beverage dispenser 115.

Figure 5:
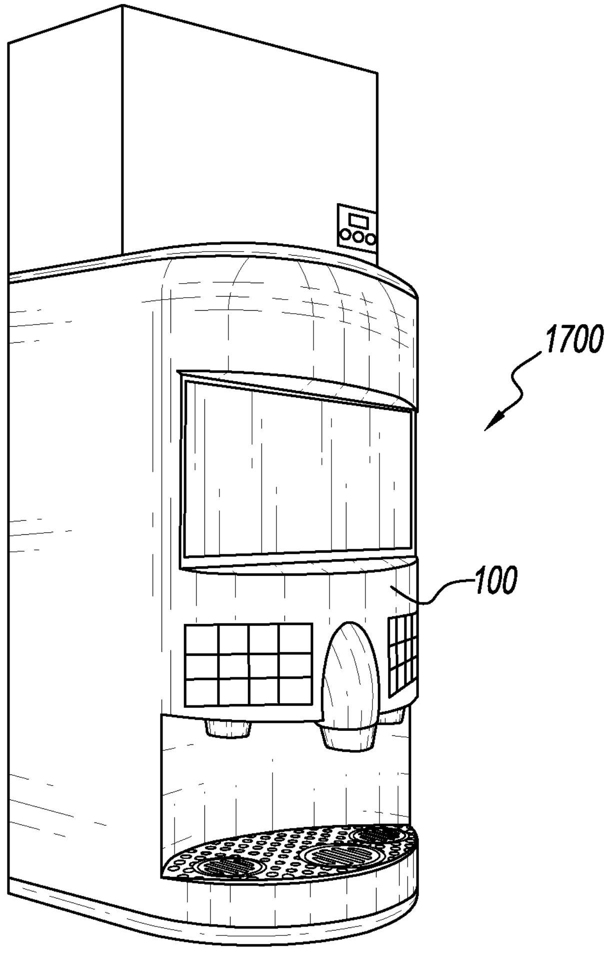
FIG. 5 shows a countertop model of a beverage dispenser of the present disclosure.

FIG. 5 shows a countertop model a beverage dispenser system 1700 including assembly 100. Beverage dispenser system 1700 is the same as beverage dispenser system 1600, however, beverage dispenser system 1700 does not have support 1640. Beverage dispenser system 1700 can be supported on a countertop. Countertop model a beverage dispenser system 1700 possesses the same beverage dispensing flexibility; however, all ingredients are remotely chilled and pumped to the point of dispensing via known conduit technology/systems.

Figure 6:
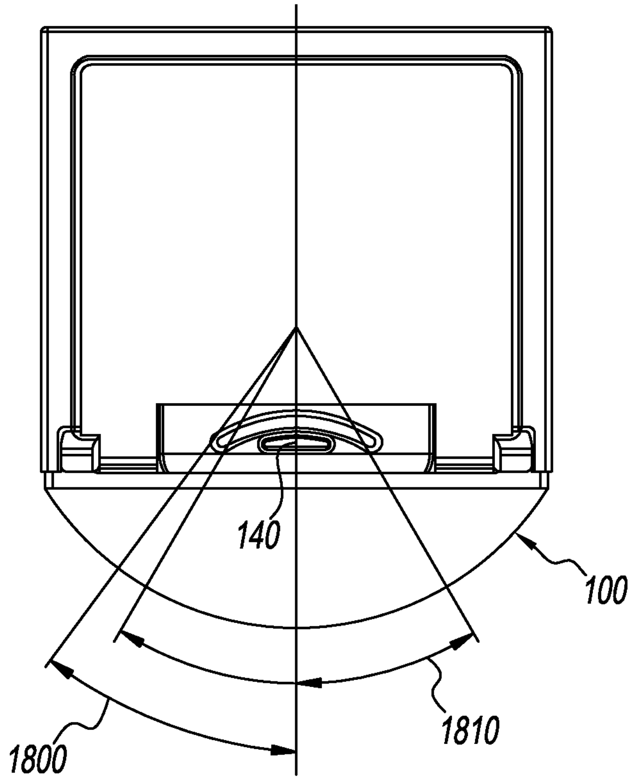
FIG. 6 shows the angular separation for various beverage dispensing machine functionalities provided by a non-linear beverage dispenser of the present disclosure.

Referring to FIG. 6, ice dispenser 140 may extend along an arc with a central angle 1800 of 37 degrees. User interface

1610 is, for example, a touchscreen that extends along an arc of dispense portion 120 at a central angle 1810 of 62 degrees.

In operation, assembly 100 dispenses a first beverage from first beverage dispenser 110 for a user 500, and assembly 100 dispenses a second beverage from second beverage 115 dispenser for a user 500 simultaneously to dispensing the first beverage. Two or more users can pour themselves a drink independently and simultaneously to increase throughput by preventing waiting and queuing. A drink selection for both first beverage dispenser 110 and the second beverage dispenser 115 can be simultaneously inputted. Ice dispenser 140 is a single ice dispenser used for both the first beverage and the second beverage. First beverage dispenser 110 and second beverage dispenser 115 each have a nozzle positioned along dispense portion 120 that has a shape that forms an arc and/or a shape that is non-linear forming an angle between the at least two beverage dispensers that is less than 180 degrees. The arc shape of housing 105 allows two or more users to pour themselves a drink simultaneously by arching the dispensing front and increasing usable space.

First beverage dispenser 110 and second beverage dispenser 115 can be beverage dispensers that dispense different drinks. For example, first beverage dispenser 110 may dispense a frozen beverage drink and second beverage dispenser 115 can dispense a carbonated beverage. First beverage dispenser 110 and second beverage dispenser 115 that dispense different drinks reduces the counter and/or floor space needed to accommodate the individual footprint of each beverage dispenser. Also, for the restaurant establishment and the user/operator, the user/operator does not need to move between beverage dispenser machines in order to dispense different types of beverages. Moreover, service calls, preventative maintenance and calibration, and the need to store and have available extra spares parts are all reduced by assembly 100 that has first beverage dispenser 110 and second beverage dispenser 115 that dispense different drinks.

It should also be recognized that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A beverage dispenser assembly comprising:

a housing having a plurality of sides; and a dispense portion with an outer surface having a curved shape that forms at least one of said sides of the housing and comprising at least two beverage dispensers each having a nozzle disposed on the curved shape opposite the outer surface along the dispense portion; and an ice dispenser disposed between the at least two beverage dispensers on the curved shape opposite the outer surface, wherein the points of location of said at least two dispensers and said ice dispenser along the curved shape form a triangle, wherein the points of location of said at least two beverage dispensers form an angle of operation of between about 90° to less than 180°, wherein the angle of operation is determined by the intersection of lines perpendicular to the tangent to points on the curved portion represented by the location of the at least two beverage dispensers, and wherein the curved shape provides more than 40 inches of useable space so as to allow a plurality of users to use the beverage assembly simultaneously.

2. The beverage dispenser assembly of claim 1, further comprising at least one user interface that is a touchscreen disposed on the outer surface of the curved portion.

3. The beverage dispenser assembly of claim 2, wherein the at least one user interface comprises a first user interface disposed on the outer surface of the curved portion proximal a first of the at least two beverage dispensers and a second user interface disposed on the outer surface of the curved portion proximal a second of the at least two beverage dispensers.

4. The beverage dispenser assembly of claim 3, wherein each of the first and second user interfaces allows for dispense of a different beverage for each of the at least two beverage dispensers.

5. The beverage dispenser assembly of claim 1, wherein the housing has a support surface below the nozzles of the at least two beverage dispensers and a space between the nozzles of the at least two beverage dispensers and the support surface.

6. The beverage dispenser assembly of claim 1, further comprising an ice maker connected to the housing.

7. The beverage dispenser assembly of claim 1, further comprising a user interface connected in the housing, wherein the user interface is flat.

8. The beverage dispenser assembly of claim 1, wherein the housing has a flat portion on a side opposite the dispense portion, and wherein the flat portion has a length of greater than about 30 inches.

9. The beverage dispenser assembly of claim 1, further comprising a user interface connected in the housing, wherein the user interface is removable.

10. The beverage dispenser assembly of claim 1, wherein the ice dispenser is a single ice dispenser.

* * * * *